United States Patent
Hayashi et al.

(10) Patent No.: US 7,794,293 B2
(45) Date of Patent: Sep. 14, 2010

(54) MARINE PROPULSION SYSTEM AND MARINE VESSEL HAVING SAME

(75) Inventors: A. Koichi Hayashi, Tokyo (JP); Michihisa Tsutahara, Hyogo (JP)

(73) Assignee: Tama-Tlo, Ltd., Tokyo (JP)

(*) Notice: Subject to any disclaimer, the term of this patent is extended or adjusted under 35 U.S.C. 154(b) by 569 days.

(21) Appl. No.: 11/066,871

(22) Filed: Feb. 24, 2005

(65) Prior Publication Data
US 2005/0193717 A1 Sep. 8, 2005

(30) Foreign Application Priority Data
Feb. 25, 2004 (JP) .................... 2004-049639

(51) Int. Cl.
*B63H 11/14* (2006.01)
*F02K 5/02* (2006.01)
*F02C 5/00* (2006.01)

(52) U.S. Cl. .................... 440/45; 60/247; 60/39.76
(58) Field of Classification Search .............. 60/247, 60/39.38, 39.76; 440/45
See application file for complete search history.

(56) References Cited

U.S. PATENT DOCUMENTS

| | | | | |
|---|---|---|---|---|
| 1,035,454 A | * | 8/1912 | Lewis | 60/247 |
| 1,475,393 A | | 11/1923 | Nacheni | |
| 2,943,440 A | * | 7/1960 | Andras | 60/221 |
| 5,513,489 A | * | 5/1996 | Bussing | 60/39.38 |
| 6,931,858 B2 | * | 8/2005 | Venkataramani et al. | 60/776 |
| 2003/0183109 A1 | | 10/2003 | Rudhard et al. | |
| 2004/0000134 A1 | * | 1/2004 | Tew et al. | 60/247 |

FOREIGN PATENT DOCUMENTS

| | | |
|---|---|---|
| DE | 34 35 076 A1 | 4/1986 |
| FR | 2 348 103 A | 11/1977 |
| JP | 05-262288 | 10/1993 |

* cited by examiner

*Primary Examiner*—Michael Cuff
*Assistant Examiner*—Gerald L Sung
(74) *Attorney, Agent, or Firm*—Knobbe Martens Olson & Bear LLP

(57) ABSTRACT

A marine propulsion system having a simple configuration and high energy efficiency and a marine vessel having the same. A detonation device for generating a detonation wave and a detonation wave discharger for releasing a detonation wave generated in the detonation device into the water so as to propel the marine vessel. When a detonation wave generated in the detonation device is discharged into the water by the detonation wave discharger, the discharged detonation wave pushes against the water, so a thrust pushing against a hull is generated as a reaction to the pushing force. A large-scale mechanism such as a propulsion system using a mechanical drive mechanism such as a screw or a propulsion system for generating a high pressure gas by utilizing a compressor is not needed, so the configuration can be simplified. Further, the water is pushed away by the detonation wave, so turbulence becomes hard to occur in the water, and the loss of the energy due to turbulence can be greatly reduced.

5 Claims, 4 Drawing Sheets

MARINE PROPULSION SYSTEM AND MARINE VESSEL HAVING SAME

CROSS REFERENCES TO RELATED APPLICATIONS

The present invention contains subject matter related to Japanese Patent Application No. 2004-049639 filed in the Japan Patent Office on Feb. 25, 2004, the entire content of which being incorporated by reference.

BACKGROUND OF THE INVENTION

1. Field of the Invention

The present invention relates to a marine propulsion system and a marine vessel having the same.

2. Description of the Related Art

General marine propulsion systems obtain thrust by mechanically driving a screw etc. For example, they obtain thrust by transmitting power generated by a prime mover to a screw by a shaft system so as to turn it in the air or water.

Contrarily, the marine propulsion system disclosed in Japanese Patent No. 3366663 obtains thrust by supplying high pressure gas from the bottom of the hull into the water at the rear.

A marine propulsion system obtaining thrust by mechanically driving a screw etc. has the disadvantage that the structure is complex and the system is apt to become large in size. Further, mechanical loss occurs, so there is the disadvantage that the energy efficiency is low. Further, when the relative speed of the blades of the screw and the flowing water becomes large, the water becomes aerated, that is, the phenomenon referred to as "cavitation" occurs, so there is a limit to the increase of the propulsion speed. In addition, when using as the prime mover a diesel engine or other internal combustion engine, a gas such as carbon dioxide is discharged into the air, so there is also the disadvantage that the exhaust becomes a cause of air pollution.

On the other hand, the marine propulsion system disclosed in Japanese Patent No. 3366663 burns air raised in pressure using for example a compressor together with the fuel in a combuster to obtain a high temperature and high pressure gas. For this reason, a prime mover for driving the compressor becomes necessary, so there is the disadvantage that the device is apt to become large in size. Further, loss occurs along with the drive operation of the compressor, so there also exists the disadvantage that the energy efficiency is low.

SUMMARY OF THE INVENTION

It is desirable to provide a marine propulsion system having a simple configuration and high energy efficiency and a marine vessel having such a propulsion system.

According to the present invention, there are provided a marine propulsion system having a detonation device for generating a detonation wave and a detonation wave discharger for discharging the detonation wave generated in the detonation device into the water so as to propel a marine vessel and a marine vessel having that system.

According to the present invention, the discharge of the detonation wave generated at the detonation device into the water by the detonation wave discharger causes thrust to be generated as a reaction to the force of the detonation wave pushing against the water. For this reason, thrust is obtained by a simple configuration not using any mechanical drive mechanism such as a screw or compressor. Further, there is none of the mechanical loss from the screw, compressor, etc., so the energy efficiency becomes high. Further, the cavitation phenomenon which used to obstruct the increase in the propulsion speed when using a screw etc. is suppressed, so it becomes possible to raise the propulsion speed over the limit of the propulsion systems of the related art.

Preferably, the detonation wave discharger includes a wall arranged in contact with the water and a discharge port of the detonation wave provided in this wall. Further, the surface of the wall in contact with the water is recessed inward. The recess expands toward the bottom of the hull. Due to this, when the water in the region surrounded by the surface of the wall is swept away by the detonation wave discharged from the discharge port, new water is smoothly fed from below the hull to the region surrounded by this surface.

Further, the wall may have a sloping surface where the depth of the recess becomes greater from the front side in the propulsion direction toward the rear side. In this case, the discharge port of the detonation wave may be arranged at the sloping surface. Due to this, the water pushed away by the detonation wave discharged from the discharge port smoothly flows along the sloping surface of the wall and is swept away to the rear in the propulsion direction.

Further, preferably the detonation device intermittently generates a detonation wave. In this case, the system may have a controller for controlling the generation cycle of the detonation wave in the detonation device in accordance with the magnitude of the thrust to be generated.

Further, the detonation wave propulsion system of the present invention may be provided with a plurality of detonation devices as well. In this case, the detonation wave discharger may include a plurality of discharge ports for discharging the detonation waves generated in the plurality of detonation devices. Further, in this case, the controller may select a detonation device for generating the detonation wave from among the plurality of detonation devices. Even with such a configuration, it is possible to control the magnitude of the generated thrust.

According to the present invention, drive mechanisms such as a screw becomes unnecessary, therefore the configuration can be simplified and, at the same time, the mechanical loss becomes small, so the energy efficiency can be raised.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Before explaining a preferred embodiment of the present invention, an explanation will first be given of the phenomenon referred to as "detonation".

"Detonation" in the phenomenon of flame being propagated at a very high speed along with a shock wave. Flame generated by normal combustion is propagated at a speed of a few meters per second at most, but in contrast flame generated by detonation is propagated at a tremendous speed of several thousands of meters per second. Further, the temperature and pressure of the shock wave (detonation wave) generated due to detonation become very high in comparison with flame due to normal combustion.

Such a detonation phenomenon can be obtained by suitably controlling the flow of the air and the process of combustion as will be explained next.

FIGS. 1A to 1D are views of an example of the configuration of a detonation device generating the detonation wave. The detonation device shown in FIGS. 1A to 1D has a detonation pipe 11, a valve 12, and an igniter 13.

The detonation pipe 11 is a hollow pipe. The transition from normal combustion to detonation occurs in the space inside this.

The valve 12 introduces air A1 and fuel A2 into the detonation pipe 11.

The igniter 13 ignites an air-fuel mixture 14 including the air A1 and the fuel A2 filled inside the detonation pipe 11 by a spark from for example an electrodischarge.

Figure 1A:
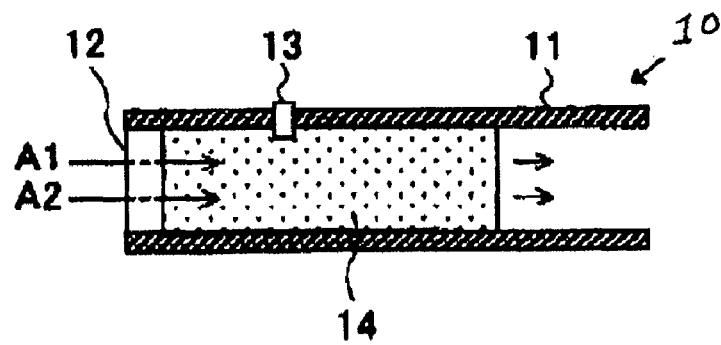
FIGS. 1A to 1D are views of an example of the configuration of a detonation device for generating a detonation wave.

First, as shown in FIG. 1A, the air A1 in introduced into the detonation pipe 11 via the valve 12. Then, during the introduction of the air A1, the fuel A2 is introduced into the detonation pipe 11 via the valve 12.

Figure 1B:
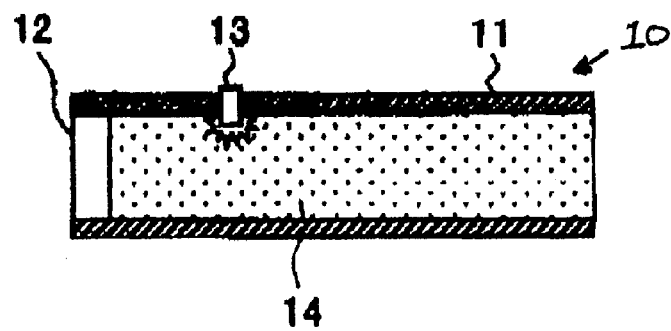

When the internal portion of the detonation pipe 11 is filled with the air-fuel mixture of the air A1 and the fuel A2, the valve 12 is closed and the air-fuel mixture 14 is ignited by the igniter 13 (FIG. 1B).

Figure 1C:
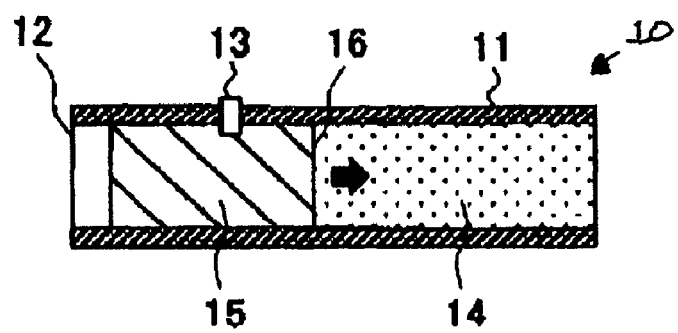
Figure 1D:
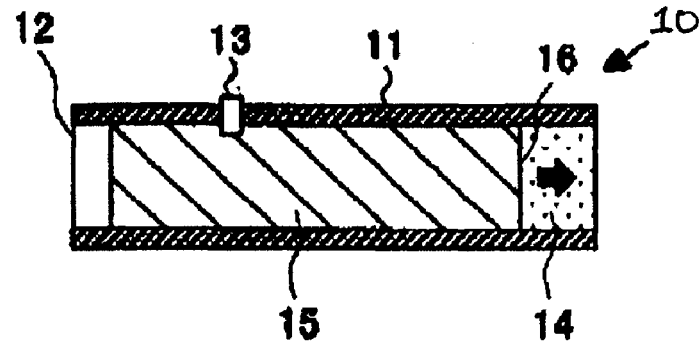

When the spark starts the combustion of the air-fuel mixture 14 and the flame spreads in the detonation pipe 11, the flame changes to a detonation after a while. Namely, when the flame 15 is propagated in the pipe, a weak pressure wave is discharged from the flame 15 along with this. This further changes to a shock wave which travels in front of the flame 15. The temperature and pressure become high behind the shock wave, therefore, the power of the flame 15 following it is accelerated and the flame 15 catches up with the shock wave after a while. In this way, a detonation wave combining the shock wave and the flame 15 is generated. A wavefront 16 of the detonation wave travels to an opening of the detonation pipe 11 at a tremendous speed exceeding the speed of sound (FIGS. 1C and 1D).

Figure 2:
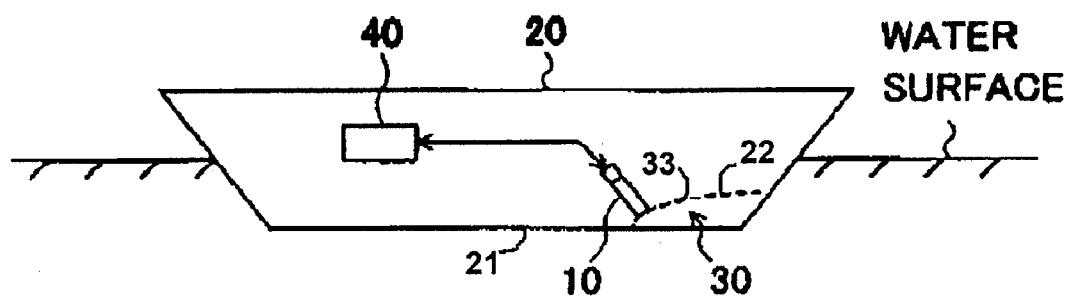
FIG. 2 is a view of an example of the configuration of a vessel and its propulsion system according to embodiments of the present invention.

The marine propulsion system according to the present embodiment generates thrust by discharging such a detonation wave toward the inside of the water, FIG. 2 is a view of an example of the configuration of a marine vessel 20 and its propulsion system according to embodiments of the present invention. The marine vessel 20 shown in FIG. 2 has a detonation device 10, a detonation wave discharger 30, and a controller 40 as the propulsion system thereof. The marine vessel 20 shown in FIG. 2. also has a bottom portion 21 and a high flat portion 22. The detonation wave discharger 30 has a curved recess portion 33 between the bottom portion 21 and the high flat portion 22 of the marine vessel 20.

The detonation device 10 is an embodiment of the detonation device of the present invention, the detonation wave discharger 30 is an embodiment of the detonation wave discharger of the present invention, and the controller 40 is an embodiment of the controller of the present invention.

The detonation device 10 is a device for generating a detonation wave and has the same configuration as that of for example the detonation device shown in FIGS. 1A to 1D explained above. The detonation device 10 generates a detonation wave under the control of the controller 40.

The detonation wave discharger 30 discharges the detonation wave generated at the detonation device 10 into the water.

Figure 3A:
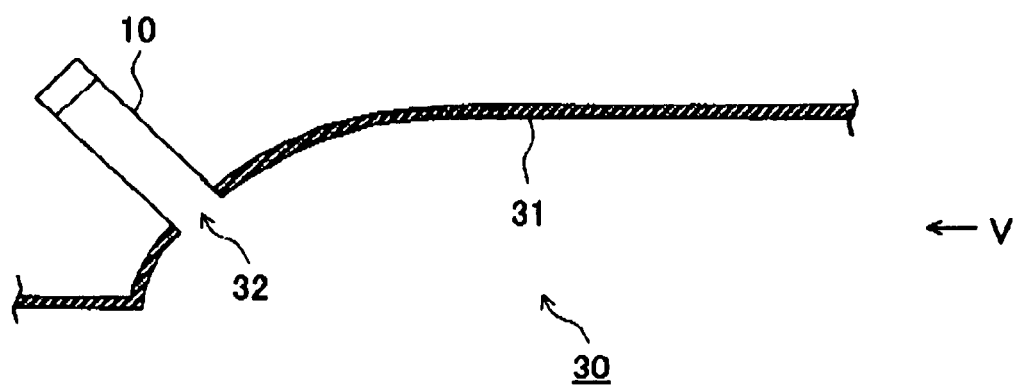
FIGS. 3A and 3B are views of an example of the configuration of a detonation wave discharger.
Figure 3B:
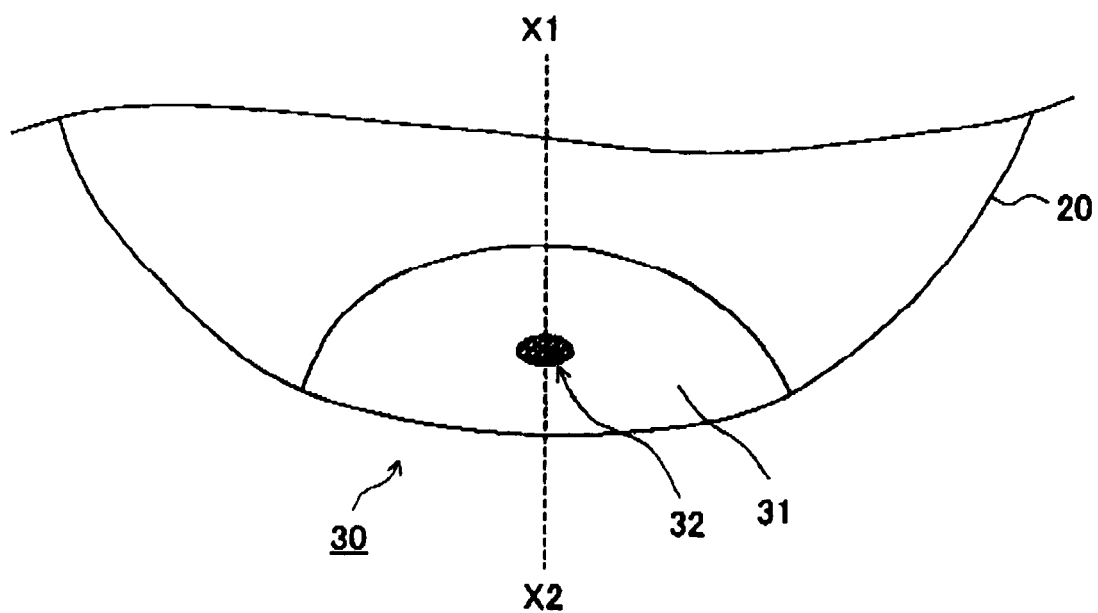

FIGS. 3A and 3B are views of an example of the configuration of this detonation wave discharger 30. FIG. 3A is a sectional view of the detonation wave discharger 30 when seen from the lateral direction of the hull 20, and FIG. 3B is a view of the outer appearance of the detonation wave discharger 30 seen from the rear of the hull 20. Namely, FIG. 3B is a view of the outer appearance when viewing the hull 20 in a direction indicated by an arrow V, while FIG. 3A is a sectional view cutting the hull 20 along a dotted line X1-X2 is FIG. 3B.

As shown in FIGS. 3A and 3B, the detonation wave discharger 30 has a wall 31 arranged in contact with the water and a discharge port 32 of the detonation wave provided in this wall 31.

The surface of the wall 31 in contact with the water is recessed inward. This recess expands toward the bottom of the hull. Further, it has a sloping surface where the depth of the recess becomes greater the further from the front toward the rear side in the propulsion direction. The discharge port 32 is arranged in this sloping surface.

For example, as shown in FIGS. 3A and 3B, in cross-section, the wall 31 has a curved surface shaped like a long bell vertically cut into half from its top to bottom and laid flat with its cut surface parallel to the horizontal plane. The discharge port 32 is arranged in the sloping surface of this curved surface.

The controller 40 performs various control relating to the generation of the detonation wave in the detonation device 10. For example, in process of generation of the detonation wave shown in FIGS. 1A to 1D, it controls the timing of opening/closing of the valve and the ignition timing of the igniter 13.

Further, the controller 40 causes the detonation device 10 to intermittently generate a detonation wave and, at the same time, controls the cycle of the generation in accordance with the magnitude of the thrust to be generated. For example, when causing the thrust to be increased, it shortens the generation cycle of the detonation wave, while when causing the thrust to be reduced, it lengthens the generation cycle of the detonation wave.

Figure 4A:
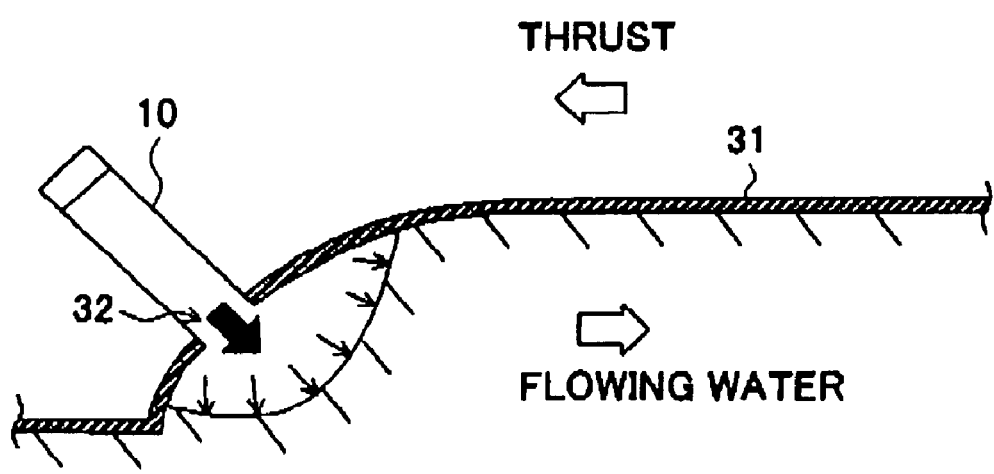
FIGS. 4A and 4B are views illustrating a flow of water caused by the detonation wave discharger at the time of propulsion.
Figure 4B:
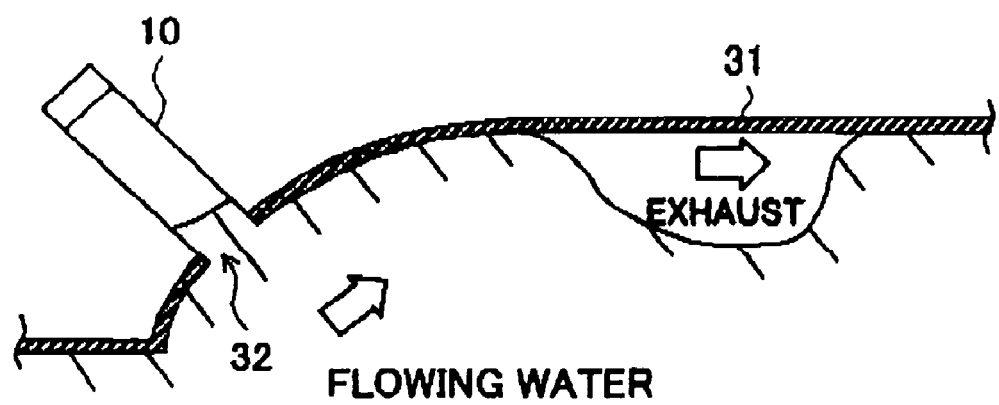

Here, an explanation will be given of the propulsion operation of a marine vessel having the above configuration. FIGS. 4A and 4B are views illustrating the flow of water around the detonation wave discharger 30 at the time of propulsion.

When the detonation device 10 operates under the control of the controller 40 and the detonation wave is discharged from the discharge port 32, this detonation wave pushes away the water near the discharge port 32 surrounded by the wall of the wall portion 31 (FIG. 4A). The water is swept away to the rear of the hull 20 along the wall surface, so a force acts upon the hull 20 in a direction opposite to this flowing water. This force becomes the thrust and propels the marine vessel forward.

By the propulsion of the marine vessel, new water flows into the region surrounded by the wall of the wall portion 31 from the bottom of the hull 20 (FIG. 4B). The combustion gas discharged from the detonation device 10 as the detonation wave is pushed by this flowing water and flows to the rear of the hull 20 along the surface of the wall 31.

By the repetition of such steps, kinetic energy is given to the hull 20, and the marine vessel travels on the water.

The propulsion speed of the marine vessel may be adjusted by control of the generation cycle of the detonation wave by the controller 40. Namely, when increasing the propulsion speed, the controller 40 sets the generation cycle of the detonation wave in the detonation device short. By this, the step of pushing away the water shown in (FIG. 4A) is frequently repeated in a certain time, therefore the kinetic energy of the hull 20 increases. Conversely, when decreasing the propulsion speed, it sets the generation cycle of the detonation wave long, so the kinetic energy of the hull is reduced.

As explained above, according to the marine vessel and its propulsion system according to the present embodiment, when the detonation wave generated at the detonation device 10 is discharged into the water by the detonation wave discharger 30, the discharged detonation wave pushes away the water, and thrust pushing against the hull 20 is generated as a reaction with respect to the pushing force.

For this reason, a large-scale mechanism such as a propulsion system using a mechanical drive mechanism such as a screw and/or a propulsion system generating high pressure gas by utilizing a compressor is not needed, so the configuration can be made very simple. Due to this, the number of parts can be decreased, and the number of processes required for assembly and construction can be decreased, so a great reduction of manufacturing cost can be achieved.

Further, no large-scale drive mechanism is needed and no mechanical lose as in a system of the related art is generated, so the total energy efficiency can be raised.

Further, in a propulsion system of the related art which shoots out jets of gas caused by ordinary combustion so as to accelerate the flowing water, turbulence occurs in the water due to the jets of gas. Namely, the exchange of the kinetic energy from the jets of gas to the flowing water is carried out in a turbulent state. Contrary to this, according to the present embodiment of pushing away the water by a detonation wave, turbulence becomes hard to occur in the water, so it becomes possible to accelerate the water as a mass. For this reason, it becomes possible to greatly reduce the loss of energy due to the turbulence. In this point as wall, the energy efficiency can be raised in comparison with the propulsion system of the related art.

Further, in the propulsion system of the related art obtaining thrust by using a screw or pump, the cavitation phenomenon is difficult to avoid, so there is a limit to the increase in the propulsion speed. Contrary to this, in the propulsion system according to the present embodiment, no blades or other actuators are used, therefore even if the propulsion speed becomes fast, no cavitation phenomenon occurs, so it becomes possible to increase the propulsion speed over the limit of the propulsion systems of the related art.

In addition, in the present embodiment, the exhaust gas is discharged into the water and is not discharged into the atmosphere as it is as in the propulsion systems of the related art. Carbon dioxide, considered the main cause of the greenhouse effect, easily dissolves in water by nature, therefore, according to the present embodiment, the amount of emission of gas causing pollution into the atmosphere can be reduced.

Further, as shown in FIG. 3A and 3B, in the detonation wave discharger 30, the wall 31 is arranged in contact with the water, and the discharge port 32 of the detonation wave is provided in this wall 31. The surface of the wall 31 in contact with the water is recessed inward. This recess expands outward toward the bottom of the hull 20. By such a structure, when the water in the region surrounded by the surface of the wall 31 is swept away by the detonation wave discharged from the discharge port 32, new water is smoothly supplied to the region surrounded by this surface from the bottom of the hull. For this reason, the flow of the water supplied to the region surrounded by the wall surface becomes smooth, and improvement of the thrust can be achieved.

Further, the wall 31 has a sloping surface where the depth of the recess becomes greater the further from the front side toward the rear side in the propulsion direction. The discharge port 32 of the detonation wave is arranged in this slope. By such a structure, the water pushed away by the detonation wave discharged from the discharge port 32 is swept away to the rear side in the propulsion direction along the slope of the wall 31, therefore, the flow of the water pushed out of the region surrounded by the wall surface becomes smooth, and an improvement of the thrust can be achieved.

Further, according to the marine vessel and its propulsion system according to the present embodiment, the detonation wave is intermittently generated from the detonation device 10 under the control of the controller 40, and the cycle of the generation is controlled in accordance with the magnitude of the thrust to be generated. Accordingly, in the same way as the case of the related art, it becomes possible to freely adjust the magnitude of the thrust to be generated.

While a preferred embodiment of the present invention was explained above, the present invention is not limited to only this embodiment and further includes various variations.

For example, in the above embodiment, an example of providing only one detonation device 10 was shown, but a plurality of detonation devices may be provided in accordance with the magnitude of the thrust required for the marine vessel as well. In this case, a plurality of discharge ports for releasing the detonation waves generated in the plurality of detonation devices can be provided as well. By this, it becomes possible to apply the present invention to marine vessels having various sizes from small private boats to large-sized vessels such as tankers.

Further, in this case, the controller can select the detonation device for generating the detonation wave from among a plurality of detonation devices in accordance with the magnitude of the thrust to be generated as well. By this, it becomes possible to control the system so that the detonation wave is generated by a large number of detonation devices when a large thrust is necessary and the detonation wave is generated by a small number of detonation devices when a small thrust is necessary, so the range of control of the thrust can be broadened.

The marine propulsion system explained above has a simple structure, so the size thereof can be made small. For this reason, a compact structure enabling the marine propulsion system of the present invention to be externally attached to existing marine vessels utilizing for example screws can be employed as well.

It should be understood by those skilled in the art that various modifications, combinations, sub-combinations, and alterations may occur depending on design requirements and other factors insofar as they are within the scope of the appended claims or the equivalents thereof.

What is claimed is:

1. A marine propulsion system provided in a water vessel comprising a bottom portion and a high flat portion, the system comprising:
   a single detonation device generating a flame with a shock wave by the detonation phenomena;
   control means for controlling the generation of the flame; and
   a detonation wave discharger,
   wherein the detonation device comprises:
      a detonation pipe having a straight hollow shape and a uniform inner diameter;
      a valve provided to one end of the detonation pipe, for introducing air and fuel into the inside of the detonation pipe; and an igniter provided at the side wall of the detonation pipe and adjacent to the one end of the detonation pipe, for igniting an air-fuel mixture in the detonation pipe, and wherein the control means controls:
a) the valve to be opened to introduce air and fuel until the air-fuel mixture is filled in the detonation pipe;
b) the valve to be closed; and
c) the igniter to be energized for igniting the air-fuel mixture, to thereby induce the detonation phenomena in the detonation pipe so that a resultant detonation wave comprising a shock wave and the flame, having a speed of several thousands of meters per second, and a temperature and a pressure higher than what would be produce by combustion of the air-fuel mixture, and wherein the detonation wave discharger comprises a curved recess portion between the bottom portion and the high flat portion, wherein the curved recess portion is flush with the other end of the detonation pipe, and wherein the detonation pipe is inclined relative to the high flat portion to discharge the detonation wave from the other end of the detonation pipe downward into the water near the curved recess portion of the detonation wave discharger, and wherein the shape of the curved recess portion, the high flat portion, and the inclination of the detonation pipe effectively propel the water vessel, and wherein the control means controls the valve and the igniter to intermittently generate the detonation wave, wherein the frequency of the detonation wave is controlled according to a thrust or a speed of the water vessel.

2. A marine propulsion system as set forth in claim 1, further comprising a controller for controlling a generation cycle of the detonation wave in said detonation device in accordance with the magnitude of the thrust to be generated.

3. A marine propulsion system as set forth in claim 1, wherein:
the system includes a plurality of said detonation devices;
said detonation wave discharger includes a plurality of discharge ports for releasing detonation waves generated in said plurality of detonation devices; and
the system further includes a controller for selecting the detonation device for generating the detonation wave from among said plurality of detonation devices in accordance with the magnitude of the thrust to be generated.

4. A marine vessel comprising the marine propulsion system set forth in claim 1.

5. The marine propulsion system of claim 1, wherein the shock wave travels a speed greater than the speed of sound.

* * * * *